June 16, 1936.  W. W. LASKER  2,044,707
CARD PUNCHING MACHINE
Filed May 16, 1931   5 Sheets-Sheet 3

June 16, 1936.  W. W. LASKER  2,044,707
CARD PUNCHING MACHINE
Filed May 16, 1931   5 Sheets-Sheet 5

Patented June 16, 1936

2,044,707

UNITED STATES PATENT OFFICE 2,044,707

CARD PUNCHING MACHINE

William W. Lasker, Brooklyn, N. Y., assignor to Remington Rand Inc., New York, N. Y., a corporation of Delaware Application May 16, 1931, Serial No. 537,831

26 Claims. (Cl. 164—113)

This invention relates to card punching machines for statistical purposes in which a set-up is first made in a set-basket preparatory to perforating a card. In the specific instance shown the basket is similar in many respects to that employed in the Powers punching machine and includes a series of denominational plungers arranged in rows over a series of punches which in turn are arranged to cooperate with a die-plate to perforate the card. The plungers are set by a single row of actuating devices carried by a traveling carriage successively stepped or fed from one row of pl ingers to the next after completing each denominational setting.

The actuating devices for the plungers are controlled from a keyboard having depressible digit keys effective upon depression thereof to close electrical circuits through corresponding magnets operatively connected with the actuating devices which set the denominational plungers.

The perforated cards punched on the punching machine are subsequently tabulated in a tabulating machine having means for computing the statistical data registered in the cards. Heretofore in Powers machines the capacity of the tabulating equipment has been limited to a card having a comparatively small capacity of forty-five rows or columns of digit holes. When these cards are used in connection with the alphabetical Powers equipment, for example, the relatively small capacity of the card is apparent as compared with the capacity of the tabulating machine. Sometimes as much as thirty columns are used for alphabetical designation and then there are only fifteen columns available for computing data on the card.

It is one of the main objects of this invention, generally stated, to provide an extended card capacity punching machine for handling and perforating cards to be used, for example, in connection with a tabulating machine such as is disclosed in my application Ser. No. 412,262, filed Dec. 6, 1929, issued on November 4, 1930 as Patent No. 1,780,621, and in which there is provided an extended card capacity system of tabulating. By means of the tabulating machine of said application the capacity of each card is increased twofold, providing ninety columns instead of forty-five as theretofore. In accordance with the present invention certain of the columns of the card are divided in two, providing two limited zones. By representing data in a multi-hole code, the device of this invention permits the recording of twice the amount of information as was formerly recorded on the card by the use of single hole code. The upper half of the card may then be defined as the upper zone, and the lower half as the lower zone, and any group of columns in a zone may be defined as a field.

It is one of the objects of this invention to provide a punch which will efficiently handle this class of work. Not only that, but since it is necessary under certain conditions to use part of the card for standard straight work with single hole punching and part of the card in connection with the extended card capacity system, I have provided by the present invention a punching machine which is effective to handle both classes of punching upon the same card.

Figure 12:
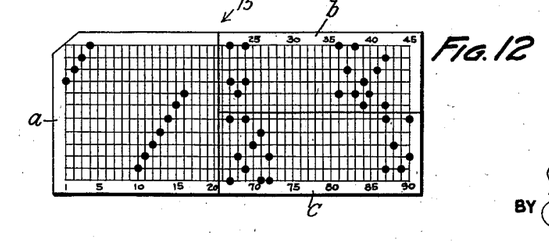
Fig. 12 is a plan view of one form of card for use in connection with the extended card capacity punching with the aid of the present machine.

According to certain features of this invention the card may be divided, as indicated in Fig. 12, into limited fields $a$, $b$, $c$, the latter two of which will for convenience be called zones $b$ and $c$. After a straight punching set-up is made in the usual manner in the left-hand field $a$ the machine is set up to punch within the upper right-hand portion or field of zone $b$ and the card is then perforated. Instead, however, of ejecting the card as heretofore, it is held in punching position while the carriage is returned preparatory to setting up and perforating the right-hand lower portion or field of zone $c$. After being perforated the card is ejected and a fresh blank card is fed to the punching position.

In one form of the invention there is provided a series of normally open double contacts, each double contact being depressible by a digit key in the keyboard associated therewith to close an electric circuit through one or more magnets. Each magnet when energized is arranged to operate the associated actuating device on the carriage, which in turn moves down and thus operates a plunger in the set basket in a given row determined by the position of the carriage. After each key depression and operation of the associated plunger or plungers, the carriage is automatically spaced in the usual manner to bring the row of actuating devices thereon into register with the next row of plungers.

In accordance with the present invention there are two independent groups of corresponding digital keys. One group is effective to set the plungers singly for straight or standard punching in a desired field $a$ of the card as shown in Fig. 12, for example, while the other group is for the purpose of setting up plungers in double capacity operation as in the limited fields of zones $b$ and $c$ in the example shown in Fig. 12. It should be understood, however, that by the use of the first mentioned group of keys alone, straight punching may be effected, if desired, on standard forty-five column cards as heretofore.

Another feature of this invention relates to means for holding the card after the first punching has been effected in, say, the limited field of zone $b$, and for preventing feeding of a new card and the ejecting of the punched card until a punching has been effected in the field of zone c. To this end novel mechanism is provided which includes a geared mechanism operatively connected with the main shaft for delaying the actuation of the card stop and the card feed, as will hereinafter more clearly appear.

Upon starting the operation of the punch, a card is first run in to the punching position. In the example shown in Fig. 12, the information pertaining to the left-hand limited field a is first set up with the aid of the special keys in the keyboard that are operated for straight punching. Information pertaining to the right-hand upper portion of the card i. e. zone b is then set up from the other group of digit keys in the keyboard. These last mentioned keys do not, in accordance with this invention, set up the set-basket directly, but are effective to close an electrical circuit through operating magnets which in turn are operatively and mechanically connected with the corresponding plungers in the set-basket. In this manner by means of a predetermined code any number of magnets may be operated from any one key in this group. The code is also so arranged that any one key in this group is effective to energize only the magnets corresponding to the set-up for the upper right-hand half or zone b of the card during the first set-up, and by the mere punching of said zone b of the card is effective to automatically switch the connections of the keys of this group so as to control the magnets which are connected so as to effect a set up for the right-hand lower half or zone c of the card. The switching means in the present instance are controlled by a comparatively slowly revolving shaft which is operatively connected with the main shaft so as to revolve one half a revolution for each revolution of the main shaft. This slowly running shaft is also arranged to control the card stop and card feed. In this manner both the card stop and card feed are delayed so as to hold the card for another revolution of the main shaft and to prevent the feeding of a fresh card, as will hereinafter more clearly appear.

In order to facilitate the operation of the machine, means are provided for informing the operator of the condition of the punching mechanism relatively to the fields b, c of the card being punched. Since, in order to return the carriage and to prepare the electrical circuits for a new set-up in either of the different zones b or c, it is necessary to trip the punch twice for each card, that is, once after the set-up in zone b, and again after the set-up in zone c, I provide means to indicate to the operator whether the mechanism is set to operate in zone b or c. Any suitable means may be used for this purpose. In the present instance I employ a rockably mounted sector having the words "Upper" and "Lower" marked on the periphery thereof and the position of the sector, visible through a small window in the keyboard plate, is indicative of the particular zone b or c of the card for which the machine is conditioned at any given time to effect a set up by control of the particular keys of the keyboard under consideration, as will presently appear.

To the above, and other ends which will hereinafter appear, my invention consists in the features of construction, arrangements of parts and combinations of devices set forth in the following description and particularly pointed out in the appended claims.

In the accompanying drawings wherein like reference characters indicate corresponding parts in the various views.

Fig. 8ª is a detail, vertical, transverse, sectional view of the same taken in line with the key stem.

Fig. 8ᵇ is a corresponding sectional view of one of the single switches controlled by the keys for the straight line punches.

The present invention may be embodied in a Powers card punching machine without modifying the structural features of said machine as they now exist to any considerable extent. This constitutes an important factor of the invention.

Figure 6:
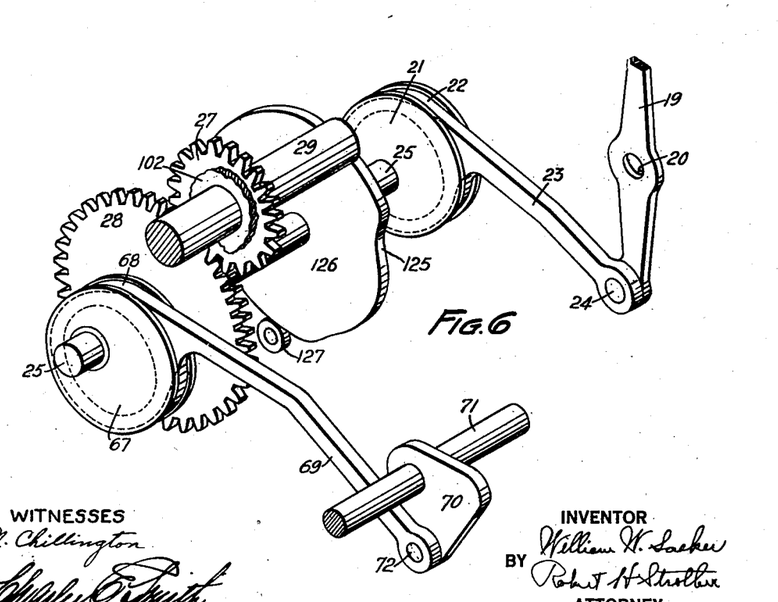
Fig. 6 is a detail, perspective view showing some of the novel control mechanism of the present invention and illustrating the parts in normal position.

According to the method of operating the machine to be hereinafter disclosed, which is illustrative of the present invention, a pack of cards 15 is first inserted in a card feeding magazine 16 and the usual "trip-bar" 17 (Figs. 2 and 11) is then operated to cycle the machine and to feed a card to punching position. The card 15 is ejected from the magazine by a picker-knife 18 operated by a lever 19 which is pivotally mounted on a shaft 20. Said lever is controlled from an eccentric disk 21 (Fig. 6) through a surrounding strap 22 that has an arm 23 pivoted at 24 to a downwardly extending arm of said lever 19. The disk 21 is secured to a revolving shaft 25 journaled in bearings 26 (Fig. 1) and is operatively connected by means of gears 27 and 28 to a main driving shaft 29. A card 15 is ejected from the magazine 16 (Fig. 2) and is then carried by revolving feed rolls 30 and 31, actuated in the usual manner, to the punching position in which the card is frictionally engaged by the usual set of driven feed rolls 33 and held thereby against a card stop 34.

Figure 1:
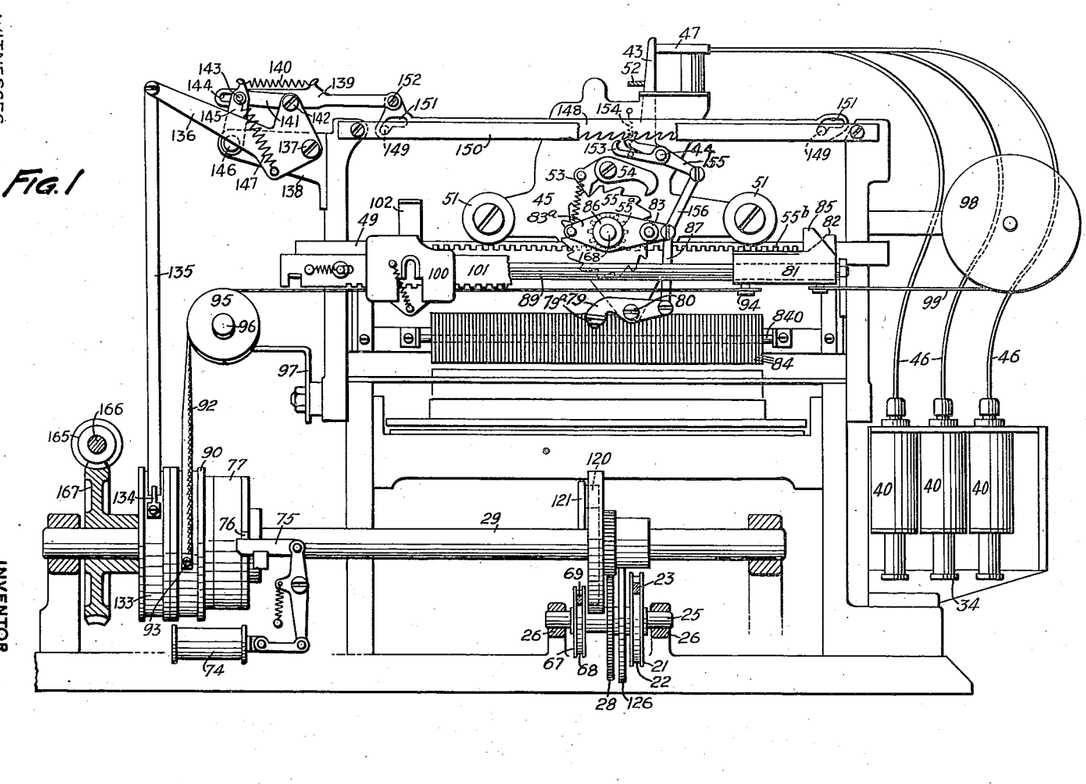
Fig. 1 is a front view in elevation, partly in cross section, of a Powers key controlled punch embodying the present invention.
Figures 2, 3, 4, 8A, 8B:
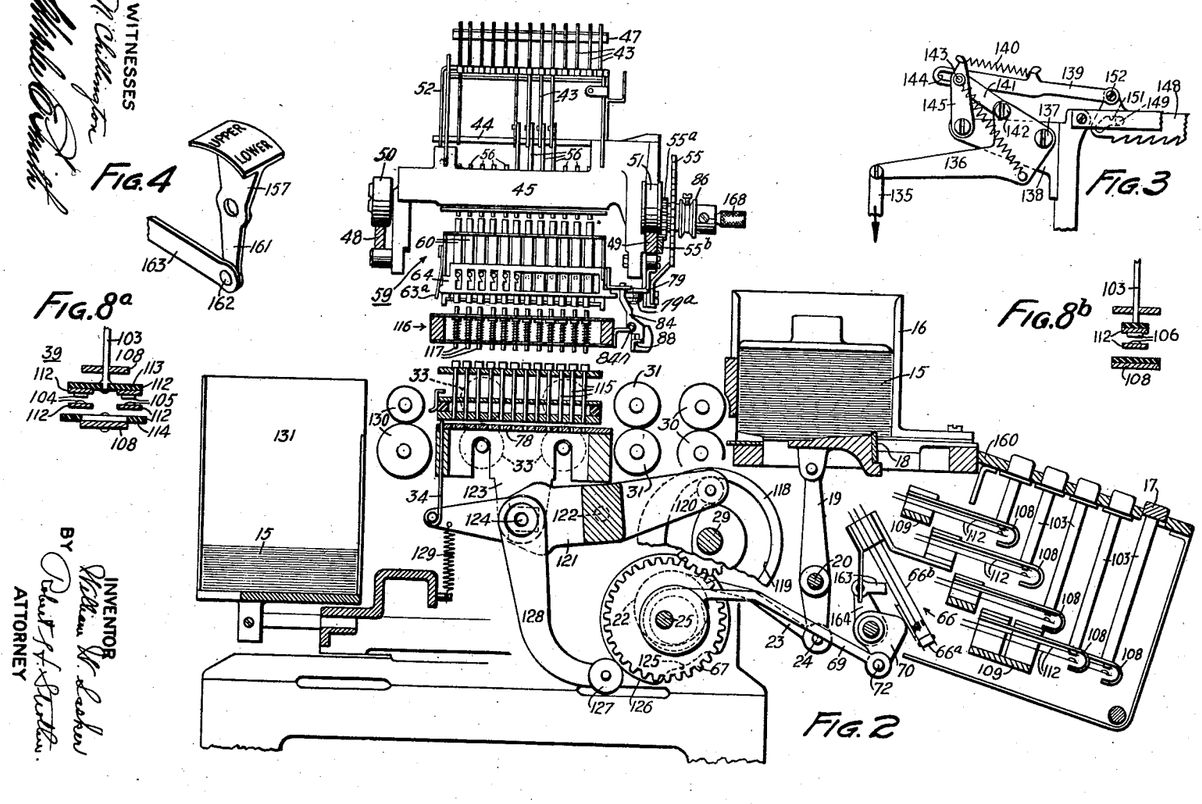
Fig. 2 is a vertical, fore and aft, sectional view of the same with parts broken away, the parts being shown in the normal or initial position.
Fig. 3 is a fragmentary, detail, front view of the back spacing mechanism in operated condition.
Fig. 4 is a detail, perspective view of a part of the card field indicating mechanism.
Figures 9, 10:
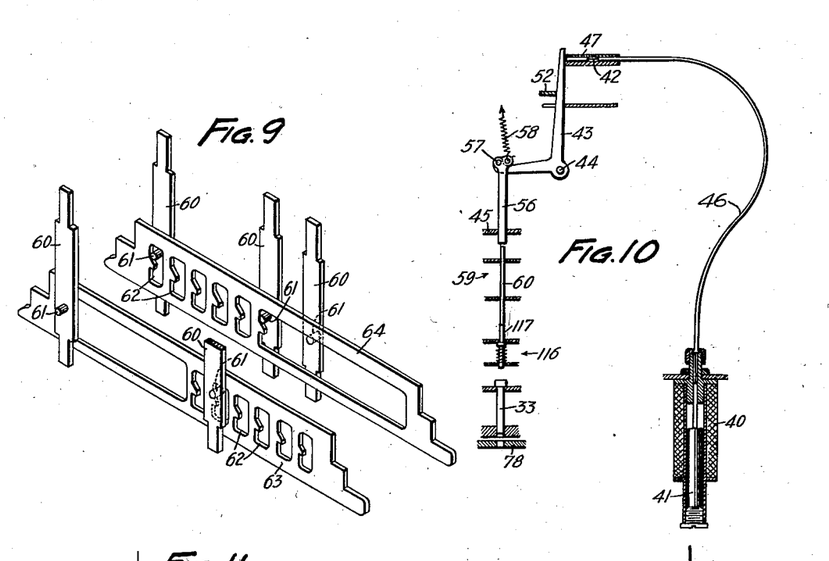
Fig. 9 is a detail, perspective view showing the double locking slide mechanism for individually setting up a condition in different fields of the card.
Fig. 10 is a diagrammatic view showing the train of connections from the associated magnet for setting one of the punches.

While the card is thus held in punching position preparatory to punching it, a set-up is made by the operation of suitable digit keys 35 or 36 in either of the two groups of keys designated as a whole by the reference numerals 37 and 38 respectively. The group 37 of digit keys is for the purpose of operating the machine in the regular manner for straight punching. That is to say, to set up a condition in the set-basket for straight or single line punching in columns 1 to 20 as shown by way of example at the left-hand portion, or limited field a, of the punched card illustrated in Fig. 12. It will be understood, however, that the group 37 of keys may be employed if desired to punch standard cards employing forty-five columns. If, however, it is desired to set-up a condition in the upper field b of the card of the character shown in Fig. 12, for extended card capacity punching, the group 38 of keys is then operated. Depression of any one of these keys is effective to close the associated double switch designated as a whole by the reference numeral 39 and shown in detail in Figs 8 and 8ª. There is one of these double switches underlying each key 36 in this group 38. The closing of any one of these switches 39 serves for energizing one or more of the solenoids 40 associated with each key. As shown in Fig. 10 each solenoid is provided with a plunger 41 therein, arranged to move upward upon energization thereof to transmit movement through a Bowden wire 42 and actuate or rock an associated bell crank lever 43. The levers 43 are all pivotally mounted on a shaft 44 carried by the usual carriage, designated as a whole by the reference numeral 45. Each Bowden wire moves in a flexible casing 46 secured at one end to the associated solenoid housing and at its other end to a casing carrying block 47 on the carriage 45. The carriage is arranged for lateral movement in the usual manner along rails 48 and 49 and is provided with anti-friction rollers 50 and 51 (Fig. 2). The usual escapement mechanism such as is disclosed, for example, in my Patent #1,684,546, dated Sept. 18, 1928, is employed to control the step-by-step feed movements of the carriage. Such escapement mechanism includes the usual universal bar 52 (Figs. 1, 2 and 10) actuated by the bell crank levers 43 and operatively connected with escapement pawls 53 and 54 which coact with an escapement wheel 55. A feed pinion 55ª, shown in Fig. 2, and in dotted lines in Fig. 1, is operatively connected to the escapement wheel 55 and meshes with a rack bar 55ᵇ secured to the frame of the machine. Each operation of a bell crank lever 43 is therefore effective to control the feed pawls 53, 54 to bring about a single step or movement of the escapement wheel and permit the carriage to be advanced one space.

The bell crank levers 43 are arranged in a row side by side and each is provided with a depending link or actuating device 56 pivotally mounted thereon at 57. Each bell crank lever 43 together with its actuating device 56 is returned to normal position by a restoring spring 58, shown in Fig. 10.

The carriage is first positioned and a set-up is made in one column of a set-basket, designated as a whole by the reference numeral 59. This basket includes five hundred and forty sliding set pins or plungers 60 arranged in rows (Fig. 2), each row having twelve of said pins or plungers 60. Each of these plungers is provided with a locking pin or extrusion 61 (Fig. 9) designed to engage a locking projection in a slot 62 in a locking slide 63 or 64. Each locking slide is pressed to the right to locking position, as the parts are shown in Fig. 2, by an individual spring 63ª. Two of such slides 63 and 64 are arranged between adjacent rows of plungers 60, and are effective to lock any number of cooperative, simultaneously depressed plungers 60 in the depressed position. The depression of any plunger 60, however, is effective to release the plungers 60 previously locked down by the associated slide 63 or 64. In order to facilitate the setting or locking of the plungers 60 in groups of, say, up to six in the same row independently, that is to say, without disturbing the plungers 60 of the second group of six in the same row which may be locked or set, there are provided two slides 63, 64 between each adjacent rows of plungers 60. Each slide 63, 64 is provided with six locking members in the slots 62 arranged to coact only with the pins 61 of the six plungers 60 that are associated therewith. The relative position of the plungers 60, the oppositely disposed pins 61 thereon and cooperative locking slides is illustrated in Fig. 9. In this manner any number of plungers 60 up to six may be set down in successive columns in the upper zone and the carriage may later be returned to set plungers 60 in successive rows of the lower zone without releasing the previously set plungers in the upper zone.

*Operating circuits*

Figures 7, 8:
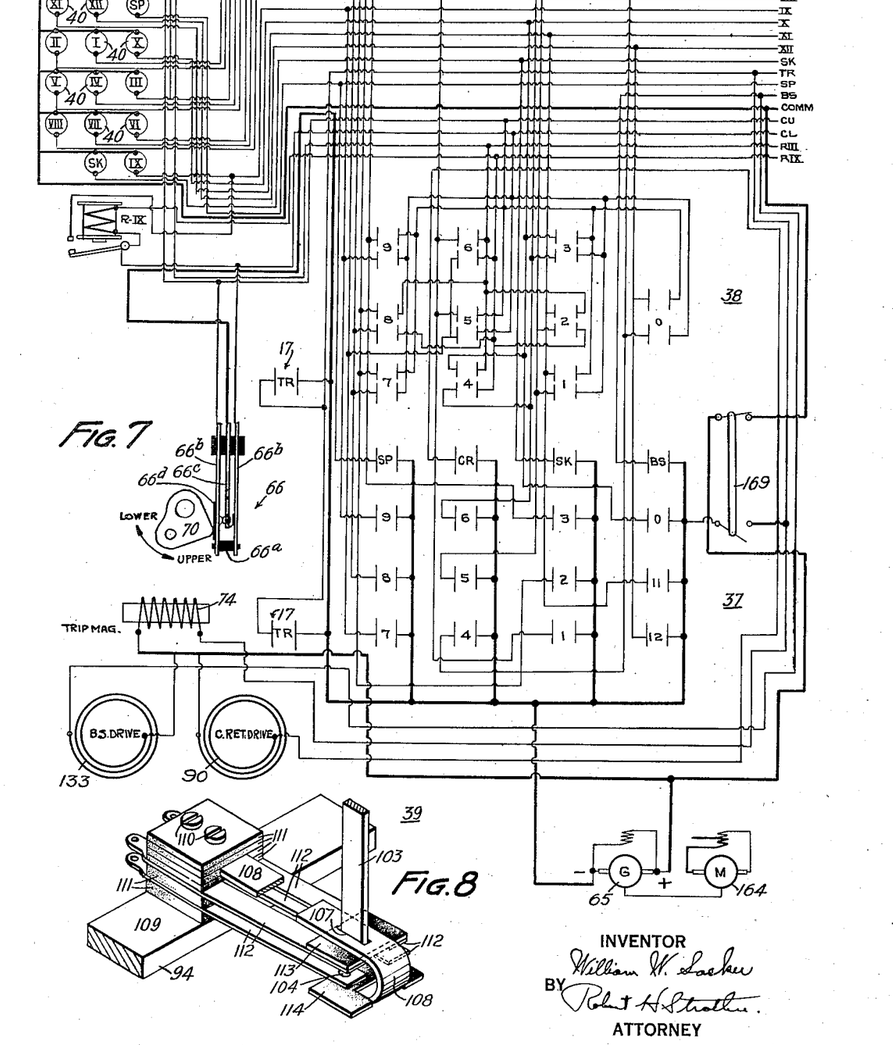
Fig. 7 is a wiring diagram showing the electrical circuits and parts associated therewith.
Fig. 8 is a detail, perspective view on an enlarged scale of one of the double switches for the extended card capacity keys.

The wiring diagram shown in Fig. 7 indicates the electrical circuits required for operation. As will be observed from the drawings, a motor or other convenient source of power, 164, connected to the shaft 166 of Fig. 1, operates the mechanism of the punch and also drives the generator 65.

*Straight punching*

For straight punching, the group of keys 37 is used. Each of these keys, as indicated, operates a single pair of contacts, one contact of each pair being connected through a switch 169 and a common lead to the positive pole of the generator 65. The second contact of each pair, operated by a given key (except for the two keys marked BS and CR), is then connected as shown in the diagram to an appropriate one of the magnets 40. Thus one terminal of the winding of each of the magnets 40 is connected to the appropriate key contact. The other terminal of each of the magnets is connected to a common lead, which, in turn, is connected to the negative terminal of the generator 65. Thus, a touch upon any of the digit keys, or upon the skip key or space key, will energize a single appropriate magnet.

One of the pair of contacts of the back space key BS is connected, as shown, to the common lead to the switch 169, and the other contact is connected directly by the circuit shown to the winding 120 of the BS drive magnet. The other terminal of the BS magnet winding is connected, as shown, to the negative terminal of the generator. Thus, when the upper contacts of switch 169 are closed, a closing of the back space key energizes the back space magnet.

Similarly, one of the contacts of the carriage return key CR is connected to the switch 169 and the other, as shown, to the carriage return drive magnet winding 78. The second terminal of the carriage return magnet winding is likewise connected to the negative terminal of the generator as indicated.

Thus, a touch upon any of the keys of the group 37 closes a single circuit for the actuation of a single magnet in a manner which will be obvious.

The trip keys 17 likewise have one of each pair of key contacts connected through the switch 169 to positive and the others directly to the trip magnet winding 74, as shown. The second terminal of the trip magnet winding is likewise connected to the negative terminal of the generator as indicated.

Combination punching

Each of the keys 38 as indicated contains two pairs of contacts operable simultaneously by the same key button, one being adapted to punching in the upper field and the other adapted to punching in the lower field. Circuits to these contacts are so arranged and controlled by the cam operated switch 66 as to cause only one to be operative at a time.

For punching the digit naught in the upper field, the switch 66 is in its right-hand position, as shown in Fig. 7, and the circuit may be traced as follows: From the positive terminal of the generator 65 through the upper contact of the switch 169; thence to the mid-contacts 66c; thence to the left-hand contact 66d, through the auxiliary common lead CU and its several branches to the upper right-hand contact of the naught key; thence to the left-hand upper contact; thence to the magnet XII; and thence to the negative terminal of the generator 65.

Actuation of the magnet XII depressed the appropriate set bar for punching a naught in the desired column. It will be noted that the upper left-hand contact of the naught key for combination punching is connected in parallel to a contact of the 12 key for straight punching.

Similar circuits are used for the "1" key to the XI magnet, the upper left-hand contact of the "1" key for combination punching being in parallel with a contact of the "11" key of the straight punching group.

Combination punching of the "2" digit requires two perforations and a somewhat more elaborate circuit is involved. The circuit may be traced from the positive lead of the generator via the switch 169 and common lead to the contacts 66c and 66d to the auxiliary common lead CU; thence to the winding of the relay RIII and the subsidiary common RIII, to which is connected the upper right-hand contact of the "2" key. The upper left-hand contact of the "2" key is connected in parallel with the "11" key of the group 37 to the magnet XI, which, in turn, is connected to the negative terminal of the generator 65. Thus, closure of the "2" key contact energizes the XI magnet and the RIII relay in series, and closure of the RIII relay closes a circuit from the common lead via the switch contact 66c and 66d to the III magnet. Thus, closure of the "2" key contact energizes the XI magnet directly, and the III magnet through the relay RIII, depressing two set bars for the combination punching.

The "3", "5", "7" and "9" keys are connected to circuits closely similar to that shown for the naught and "1" keys, the "3" key being connected to the X magnet, the "5" key to the I magnet, the "7" key to the II magnet, and the "9" key to the III magnet. The "4", "5" and "8" keys are connected to circuits similar to that of the "2" key, the relay RIII being in circuit with each.

Lower field combination punching

For lower field punching, the switch 66 is reversed in position and the contact 66b caused to cooperate with the contact 66c, thereby connecting the common lead from the upper contacts of switch 169 to the auxiliary common lead CL.

For punching a naught in the lower field, the circuit may be traced from the common lead via the switch tongues 66c and 66b, the auxiliary common lead CL to the lower right-hand contact of the naught key; thence to the IV magnet, and thence to the negative lead from the generator. Thus, closure of the naught key for the lower field punching energizes the IV magnet and sets the corresponding set bar. It may be noted that the lower left-hand contact of the combination punching naught key is connected in parallel with a contact of the "4" key for straight punching.

Similar connections are utilized for the "1" key, which is connected in parallel with the "5" key for straight punching to the V magnet.

The circuits for the "2" key for lower field punching may be traced from the common lead via the contacts 66c and 66b to the auxiliary common lead CL, the winding of the relay RIX, the secondary bus RIX to the lower right-hand contact of the combination punching "2" key, thence to the V magnet and thence to the negative generator lead. Thus, closure of the "2" key energizes the V magnet and the RIX relay in series. Closure of the RIX relay closes a circuit from the auxiliary common CL to the IX magnet. Accordingly, closure of the "2" key energizes the V and IX magnets simultaneously and depresses the appropriate two set bars for the desired combination punching.

Similar circuits are provided for the "3", "5", "7" and "9" keys, and for the "2", "4", "6" and "8" keys as will be obvious from the wiring diagram.

It will thus be seen that either group of keys may be operated at any time for straight or combination punching, and, as previously described, the combination punching will be obtained in upper or lower field according to the point in the punch cycle at which the keys are operated. The special keys, such as back-space, skip, carriage return, space and trip bar are operable with either group of digit keys.

After each key depression, the carriage is automatically spaced to the next column and upon completion of the set-up corresponding to the field in zone b of the card the "trip-bar" 17 is operated to punch the card and to cycle the machine. The "trip-bar" which is indicated by "TR" in the wiring diagram is effective to energize the trip magnet 74, and upon energization thereof the same is effective to withdraw a pawl 75 which is normally interposed in the path of a tooth 76 of a clutching mechanism 77, not shown in detail but well known in the art and disclosed in my hereinbefore mentioned Patent #1,684,546. This will permit the main shaft 29 to rotate one full revolution and by means of well known mechanism a die-plate 78 is forced against the set punches to thus perforate the field in zone b of the card. This mechanism will hereinafter be more fully described.

In order to prepare the set-basket for a set up of the plungers or pins 60 controlling the field in zone c of the card, the usual means, such for example as are disclosed in my Patent 1,684,546, are provided whereby the return movement of the carriage is effective to bring about a return of the locking slides 63, 64 to normal position, so as to in turn bring about a restoration of the locked plungers 60 to normal position. To this end the carriage is provided with a lever 79 pivoted on a stud 80. Said lever is normally held in its ineffective position shown in Fig. 1, but an operation of a carriage return slide 81 to the left causes a cam 82 thereon to engage a roller 83 on a lever 83ª on the carriage before a pick-up finger 85 on the slide engages a part 86 on the carriage to return it to its initial position. The action of the cam 82 is effective to swing the lever 83ª and, through an intermediate link 87, swing the lever 79 thus bringing a roller 79ª thereon to a position where it will during the travel of the carriage operate successively on a series of releasing members or pawls 84 which are arranged in cooperative relationship with the slides 63, 64. There is one pawl 84 at the end of each slide 63, 64, and in order to provide for permanently setting the slides, when desired, the pawls are pivotally mounted in the usual manner on a pivot bar 840, and any number of the pawls may be swung to ineffective position after first moving a locking bar 88 out of the path of said pawls to a releasing position in the usual manner.

The carriage return mechanism includes in addition to the carriage return slide 81 slidably mounted on a bar 89 on the machine frame, an electro-magnetic driving disk 90 loosely mounted upon a revolving soft iron hub fast to the main shaft 29. Operation of the carriage return key, indicated at 91 in Fig. 11 and by the letters "CR" in the wiring diagram, is effective to energize the magnetic disk 90, and by means of a tape 92 fast at 93 to the periphery of the disk 90, causes the carriage return slide 81 to move to the left in Fig. 1 when said disk is rotated, thereby returning the carriage and wiping out or clearing the set up. The tape 92 is secured to slide 81 by means of a stud 94 on said slide and is made to pass over pulley 95 pivotally mounted on a stud 96 on a fixed bracket 97. Upon demagnetization of the disk the slide 81 is returned to its initial position by means of a spring drum 98 and a tape 99 wound therearound.

In connection with the carriage return mechanism hereinbefore described, it will be understood that the usual means are provided for automatically breaking the electrical circuit when the carriage reaches the end of its travel. The circuit breaking means includes a stop block 100 slidably mounted on a lock-bar 101 and adjustable to any predetermined position along the bar where it may be locked with the aid of a finger piece 102 carried by said block. The circuit breaking means is shown in further detail in my Patent No. 1,883,986.

In the event that punching is desired only in fields a and b of a card, the trip bar 17 may be operated a second time immediately after the return of the carriage due to its first operation. When so actuated, the trip bar 17 causes the punching and ejection of the card.

In order that the setting of the plungers or pins 60 for the lower zone c of the card may be made from the same group 38 of digit keys, the switch 66 is arranged to be shifted upon rotation of the shaft 25, which shaft is rotated through half a revolution upon cycling the machine during punching of the upper zone b. In order to accomplish this object of the present invention each key stem 103 in this group 38 of keys is arranged to close the associated double switch designated as a whole by the reference numeral 39 and which is shown in detail in Figs. 8 and 8ª. Each double switch 39 is provided with double sets of contact points 104 and 105 instead of the usual single set of contact points 106 (Fig. 8ᵇ) provided under each of the keys of group 37, for conventional punching of the card. The lower end of each key stem 103 for both groups of keys is guided in a slot 107 in a metal supporting yoke or bracket 108 which is insulated from and is secured to a cross bar 109 by means of screws 110 and intervening insulating blocks 111. The contact points 104 and 105 of each of the double switches are mounted on four flat bronze strips 112 in two pairs arranged one pair above the other, the strips of each pair being arranged side by side in parallel relationship. The insulating blocks and screws hold the plates in this arrangement. In order that the bronze strips of each double switch may not be short circuited upon operation of the associated key there is provided a small plate of insulating material 113 which is secured to the upper bronze strips 112 at the free end portions thereof and spans them. The companion key stem 103 bears on the insulating strip 113 causing both connected strips 112 of the upper set to be carried down together. An insulating plate 114 is secured to the yoke or bracket 108 to limit the down motion of both sets or pairs of strips 112 and insulate them from the bracket.

Figure 5:
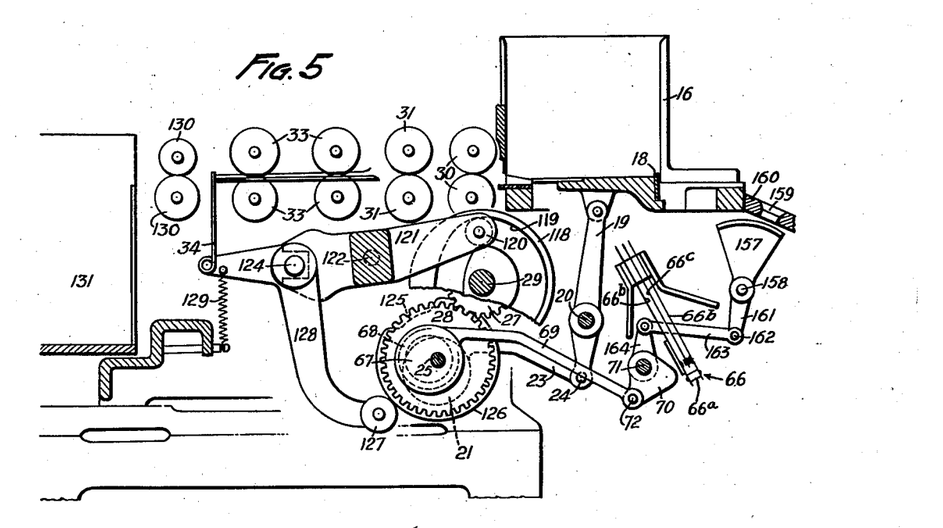
Fig. 5 is a detail, vertical, fore and aft, sectional view similar in part to Fig. 2 but showing the mechanism in a partly operated position; that is, just after a punching of the upper field of the card has been effected.

The electrical system of circuits controlled by this group 38 of keys is under control of the switch 66 which selects the sets of magnets to be operated from each depression of a key of this group. During the time the machine is set for punching in the lower zone c of the card the switch 66 is in the position shown in Fig. 5, and depression of any key of this group at this time would be effective to close an electrical circuit through the solenoids controlling the set up for the lower zone c of the card. Depressing the keys "0", "1", "3", "5", "7" and "9" of this group will at this time be effective to respectively energize the solenoids "IV", "V", "VI", "VII", "VIII" and "IX", but the depression of the keys "2", "4", "6" and "8" of this group at this time will not only respectively energize the solenoids marked "V", "VI" and "VIII", but through an intervening relay marked "R—IX" the solenoid marked "IX" will also be energized. Thus a set up will be effected to punch either one or two holes in each column of the lower zone c of the card, depending upon which key is depressed.

After successively setting the pins or plungers 60 corresponding to the lower zone c of the card the "trip-bar" 17 is again operated to cycle the machine. This will again trip the clutching mechanism, and during the revolving movement of the main shaft 29 the die-plate 78 is moved upward and the card is perforated by the effective punches 115. It will be understood that all the punches are moved upwardly upon contacting with the card except the punches in line with the pins or plungers 60 which are held down by the locking slides 63, 64. It also will be understood that there is provided a pin box 116 having spring elevated plungers or pins 117 therein, arranged in line with the pins 60. These plungers 117 serve as means for returning the pins or plungers 60 upon retracting the locking slides 63 and 64.

The operating mechanism for moving the die-plate includes a barrel cam 118 (Fig. 2) having a cam groove 119 for receiving a roller 120 carried by frame 121 pivotally mounted at 122. The latter is operatively connected with a die-plate carrying-frame 123 by means of a shaft 124.

The slow running shaft 25 controls, in addition to the switch 66, the card feeding mechanism and the card stop. After punching lower zone c of the card a notch 125 in a cam 126 carried by the shaft 25 permits the roller 127 normally riding on the periphery of the cam 126 to drop in the notch 125, and thus by means of an intervening bell crank 128 and a spring 129 associated therewith the card stop 34 is lowered to free the punched card which is fed forward by the feed rollers 33 to the feed rolls 130 and is conveyed thereby into a receiving magazine 131.

In order to correct a line set up, if desired, the carriage may be back spaced with the aid of the usual back spacing mechanism controlled by operating a depressible back space key 132 (Fig. 11) indicated at "BS" in the diagram shown in Fig. 7. This key is arranged upon a depression thereof to close an electrical circuit so as to energize a disk 133 which is normally stationary, but is mounted on a revolving soft iron core fast to the shaft 29 and is made to rotate therewith, when desired, owing to the magnetic drag when the disk is energized. Pivotally connected to the disk 133 by means of a clip 134 is a metal arm or strip 135 operatively connected to an arm of a lever 136 pivotally mounted at 137 on a fixed bracket 138. The lever 136 actuates a link 139 through an intervening spring 140. Thus a toggle link 141 is pivotally connected at one end 142 to an arm of the lever 136 that constitutes the other element of the toggle. The left-hand end of the link 139 is supported through a pin and slot connection 143, 144 by an upright arm 145 fulcrumed at 146 upon the bracket 138. The left-hand end of the spring 140 is connected to the upright arm 145 and when the latter is moved to the Fig. 3 position by the toggle the link 139 will be actuated through the spring 140 to back space the carriage. A returning spring 147 restores the parts to normal position. The initial or normal position of this mechanism is illustrated in Fig. 1 whereas the actuated position is shown in Fig. 3.

Since the carriage may be at any position along the set-basket when it is desired to back space the carriage, there is provided the usual rack bar 148 slidably mounted upon studs 149 carried by a fixed bar 150. The bar 148 is provided with slots 151 designed to first cause the bar when actuated to move downward and then longitudinally. The bar 148 is actuated by the link 139 to which it is operatively connected by means of a pivot screw 152. The downward movement of the bar 148 is effective to engage a pawl 153 pivotally mounted on the carriage and normally maintained at the limit of its upward movement shown in Fig. 1 by a spring 154. A further movement of the bar 148 longitudinally to the left is then effective to move the carriage therewith the distance between two rows of plungers 60 where the carriage is held by the escapement mechanism in the usual manner. The downward movement of the bar 148 also is effective by means of intervening mechanism including a lever 155 pivotally mounted on the shaft 44 and by a link 156 to move the lever 79 so as to render the same effective to bring about a restoration of the slides 63, 64.

Figure 11:
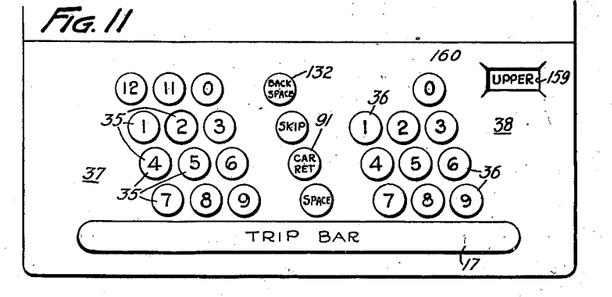
Fig. 11 is a plan view showing the keyboard arrangement with two groups of digit keys for straight and combinational punching.

According to another feature of this invention means are provided for indicating which zone of the card the machine is being set up for. To this end there is provided a rocking frame 157 (Figs. 4 and 5) pivotally mounted on a stud 158. This frame controls suitable indicating means for the operator. In the present instance the rocking frame 157 is provided with indicia carried directly thereby and designating the particular zone b or c on the card for which the set up of the punches may be effected at any particular time. Thus, the words "Upper" and "Lower" on the segmental face of the sector or frame are arranged to alternately show through a window 159 in a keyboard plate 160, as shown in Fig. 11. The frame 157 has a depending arm 161 pivoted at 162 to a link 163. This link in turn is pivoted at its other end to an arm 164 fast to the shaft 71. It will be noted that by means of this arrangement the position of the frame 157 will depend on the position of the shaft 71 and its associated switch 66 which controls the set up for the zones b and c of the card.

Both the electrical and mechanical energy required for the operation of the machine is obtained from the usual motor-generator illustrated in the wiring diagram and respectively represented by the reference numerals 164 and 65. The motor is operatively connected with the main shaft 29, as shown in Fig. 1, by means of a worm drive comprising a worm 165 mounted on a shaft 166 directly coupled with the motor shaft, and a worm wheel 167 mounted on the main driving shaft 29 of the machine.

It will be seen from Fig. 11 that the keyboard 37 has twelve keys designated as follows: "12", "11", "0", "1", "2", "3", "4", "5", "6", "7", "8", "9", whereas the keyboard 38 has but ten keys from "0" to "9", the "12" and "11" keys being omitted from the keyboard 38. It will be understood therefore that what corresponds to the "12" position on the field a of the card shown in Fig. 12 is the "0" position on the field b of the card, and what corresponds to the "4" position on the field a of the card corresponds to the "0" position on the field c. With this understanding reference will be made to the punched card shown in the drawings.

Referring to Fig. 12 which represents a sample punched card it will be seen that the following numerals are represented by the holes in the card; columns 1 to 4 inclusive, the numerals 1, 0, 11 and 12 respectively; columns 10 to 16 inclusive, the numerals 8, 7, 6, 5, 4, 3 and 2 respectively, all included in the field a on the card.

In the restricted field b the punchings in the different columns are as follows:
Column 22—0,3 which equals 0
Column 23—4 which equals 7
Column 25—0,3 which equals 0
Column 36—0,4 which equals 0
Column 37—2 which equals 3
Column 38—0,4 which equals 0
Column 39—3,5 which equals 6
Column 40—4 which equals 7
Column 41—2 which equals 3
Column 42—1,5 which equals 2

In the restricted field c the punchings in the different columns are as follows:
Column 67—0,5 which equals 0
Column 68—3 which equals 5
Column 69—0,4 which equals 0
Column 70—2 which equals 3
Column 71—1,5 which equals 2
Column 72—3,5 which equals 6
Column 87—0,4 which equals 0
Column 88—2 which equals 3
Column 89—4 which equals 7
Column 90—0,3 which equals 0

Since the "0"s or zeros following a significant figure are automatically printed on the work sheet by means of mechanism associated with the hammer mechanism in the tabulator, they need not ordinarily be printed (perforated) in the card.

However, they are sometimes punched in the cards to meet some special requirements. Thus, for example, in order that a card may be sorted in the sorting machine into any one of the twelve pockets representing the twelve possible holes in each column, under certain conditions, the zeros are perforated. The cards are usually sorted according to some fields thereof and it is in these fields that the zeros are perforated.

Sometimes the zeros are also perforated in the cards for the purpose of "blocking" other information on the card. This blocking is effective to prevent printing and accumulating of any amount represented by other perforations on the same columns of the cards.

It is for the purposes set forth above that the zeros are shown punched in the card represented in Fig. 12.

A possible method of gang punching cards by means of this machine is to first set up and punch the zone a and the upper zone b of the card, and then reinsert the punched cards in the receiving magazine and then set up and punch a lower zone c of the card.

From the foregoing description it will be understood that with the present invention one is enabled to obtain straight line punching with the aid of the group 37 of keys either throughout the entire extent of an ordinary standard forty-five column card, or one may obtain straight line punching with the aid of said keys in, say, the limited field a of the card such as is shown in Fig. 12. Further, one may provide for extended punching with the aid of the group 38 of keys alternatively, according to either the single or combinational punching in either one or both of the limited zones b and c on the card up to ninety columns. Cards punched according to the latter system can be analyzed on the ninety column tabulating machine of my cited United States Patent No. 1,780,621.

While I have hereinbefore pointed out in connection with the specific example of card illustrated in Fig. 12 the employment of straight line punching in the left-hand field a thereof and combinational punching in the zones b and c, it will be understood that with the aid of my machine a set up for either straight line and combinational punching may be effected for alternative use at any desired portions of the card to be punched depending on the use of the keys 35 or 36.

Various changes may be made in the construction, and certain features thereof may be employed without others, without departing from my invention as it is defined in the accompanying claims.

What I claim as new and desire to secure by Letters Patent, is:

1. In a card punching machine, the combination of a gang of punches arranged in a plurality of rows, a gang of set bars or plungers similarly arranged for individually controlling the punches to be rendered effective for gang punching, a single row of key controlled members for consecutively operating said rows of plungers, a locking bar cooperative with a plurality of said plungers in each said row, and a second independently operable locking bar cooperative only with a plurality of different plungers in the same row.

2. In a card punching machine, the combination of a gang of punches arranged in a plurality of rows, a gang of set bars or plungers similarly arranged for individually controlling the punches to be rendered effective for gang punching, a single row of key controlled members for consecutively operating said rows of plungers, a locking bar cooperative with a plurality of said punches in each said row, a second independently operable locking bar cooperative only with a plurality of different plungers in the same row, the construction and arrangement of the parts being such that an actuation of a plunger coacting with one of said locking bars is effective to release the previously locked plungers controlled thereby without effecting a release of the plungers locked by the other of said locking bars.

3. In a card punching machine, the combination of a gang of punches, a plurality of rows of set bars or plungers movable into and out of effective position for individually controlling the punches to be rendered effective for gang punching, a single row of key controlled members for consecutively operating said rows of plungers, a pair of independently operable locking bars interposed between each pair of adjacent rows of plungers, locking pins projecting in one direction from part only of the plungers in each row and cooperating with one only of the adjacent locking bars, the remainder of the plungers in each row having pins that project therefrom in the opposite direction from the first mentioned pins and coact only with another adjacent locking bar, whereby a set up of the plungers may be effected in one part of each row without releasing the previously set up plungers in another portion of the same row.

4. In a card punching machine, the combination of punching mechanism including a gang of punches, means for feeding a card to a single definite fixed position in respect to both card dimensions relatively to said gang of punches and in a position to be punched, stop means for arresting the feed of the card in such position, and means for withdrawing said stop means from such arresting position only after a plurality of punching operations have been effected on a card while it is held in such single definite fixed position.

5. In a card punching machine, the combination of a gang of punches, and means for holding the card in position beneath all said punches while the machine is actuated to effect a punching of the card from said punches and for holding the said card in the same position in respect to both card dimensions while the machine is actuated to effect a second punching in the same card from said punches, said means comprising means for feeding a card to said punches, stop means for arresting the feed of the card in position to be punched, and means for withdrawing said stop means to permit a feed of the card from punching position only after a plurality of punching operations has been effected on the same card.

6. In a card punching machine, the combination of punch and die members, a cam shaft for the actuation thereof, control members for said punch members, and an auxiliary shaft for the actuation of the control members, driven at a lower speed from the actuation cam shaft.

7. In a card punching machine, the combination of a die, a gang of punches adapted to punch data in different data zones on a card, a main operating shaft therefor, an auxiliary shaft driven therefrom at a different speed, and data zone control mechanism actuated thereby.

8. In a card punching machine, the combination of a gang of punches, a die, a main operating shaft therefor, an auxiliary shaft driven therefrom at a different speed and a change-over switch actuated thereby.

9. In a card punching machine, the combination of a gang of punches, a cooperating die member, means for setting selected punches, means for the actuation of said die member comprising a main drive shaft and cam members, means for segregating said punch members into upper and lower zones, means for operating said setting means in either upper or lower zones and means for indicating which zone said setting means is operating upon.

10. In a card punching machine, the combination of a gang of punches, a cooperating die member, means for actuating said die member comprising a main drive shaft and cam members, means comprising a switch member for segregating said punch members into upper and lower zones, means for setting selected punches in either upper or lower zones, and means for indicating which zone said setting means is operating upon.

11. In a card punching machine, the combination of a gang of punches, a cooperating die member, means for the actuation of said die member comprising a main drive shaft and cam members, means comprising a switch member for segregating said punch members into upper and lower zones, means for setting selected punches in either upper or lower zones, comprising a switch member, means for indicating which zone said setting means is operating upon, and an auxiliary shaft associated with said punch segregating means, which shaft is driven from said main shaft at a different speed.

12. In a card punching machine, the combination of a gang of punches, a cooperating die member, means for the actuation of said die member comprising a main drive shaft and cam members, means for segregating said punch members into upper and lower zones, means for setting selected punches in either upper or lower zones, and means comprising a flag member and an auxiliary shaft, which shaft is driven from said main shaft at a different speed, for indicating in which zone said setting means is operated.

13. In a card punching machine, the combination of a gang of punches, a cooperating die member, means for the actuation of said die member comprising a main drive shaft and cam members, means for segregating said punch members into upper and lower zones, means for setting selected punches in either upper or lower zones and means comprising a movable flag member, a shaft for the actuation thereof, an auxiliary shaft driven from said main shaft at a different speed and a member connecting said auxiliary and actuating shafts for indicating which zone said setting means is operating upon.

14. In a card punching machine, the combination of a gang of punches, a die member, means for the actuation of said die member comprising a main shaft and cam assembly, a card stop for retaining cards between said punches and said die, and means for the actuation of said card stop comprising an auxiliary shaft driven from said main shaft at a speed different therefrom and a cam on said auxiliary shaft for the actuation of said card stop member.

15. In a card punching machine, the combination of a gang of punches, a die, means for the operation of said die comprising a main shaft and cam members thereon, card feeding and stop members, and an auxiliary shaft operated at a different speed from said main shaft for the actuation of said card stop and feed members.

16. In a card punching machine, the combination of a gang of punches, means for the operation thereof, means for retaining said card in the same position under said punches during two operations thereof and means for feeding cards thereto only after alternate operation of said punches.

17. In a card punching machine, the combination of punch and die members, means including a main shaft for the operation of said die member, a card stop cooperating therewith, means for setting said punches in separate upper and lower zones, means for determining whether the settings are in the upper or lower zone and means for the actuation of said card stop and said determining means comprising a shaft and cams driven from said main shaft.

18. In a card punching machine; the combination of a set of punches and a die; means, comprising a main shaft and cam members, for the actuation of said die member; card feed and stop members cooperating with said punch and die system; means for segregating said punches into upper and lower zones; means, operative alternatively in upper or lower fields, for setting said punches; means for indicating the selected zone and means for the actuation of said card feed, stop, and zone selecting and indicating means comprising an auxiliary shaft driven from said main shaft and cams thereon for actuating the several mentioned members.

19. The method of operating a card punching mechanism comprising the steps of setting punches according to a given code, thereafter setting other punches according to another given code, operating said punches to punch a card, retaining said card under said punches, thereafter setting still other punches in a different set of fields, and operating the set punch members to punch said card in said other set of fields.

20. The method of operating a card punching mechanism comprising the steps of setting punches according to a given code, thereafter setting other punches according to another given code, operating said punches to punch a card, clearing some at least of said set punches, retaining said card under said punches, thereafter setting still other punches in a different set of fields, and operating the set punch members to punch said card in said other set of fields.

21. In a card punching machine, the combination of a die member, a plurality of punch members, set-bars for the actuation of said punches, a single row of key controlled members for the consecutive actuation of said set bars, latch members cooperating with said set-bars, each column of set-bars cooperating with two latch plates, the said latch plates being respectively adapted to cooperate with half only of said columns of set-bars.

22. In a card punching machine, the combination of a die member, a main shaft for actuating said die member, a plurality of punch members, set-bars for the actuation of said punches, latch members for the operation of said set-bars, each column of set-bars cooperating with two latch plates, said latch plates being respectively adapted to cooperate with half only of said columns of set-bars, and means for operating said punches alternatively for the actuation of alternate halves of the respective columns comprising a shaft operating at half the speed of said main shaft, and card feeding, card stop, and punch setting control mechanism operated from said shaft.

23. In a card punching machine, the combination of a gang of punches arranged in a plurality of rows, a gang of set bars or plungers similarly arranged for controlling the punches to be rendered effective for gang punching, a locking bar cooperative with a plurality of said plungers in one row and a second independently operable locking bar cooperative only with a plurality of different plungers in the same row, and a single releasing means for both said locking bars.

24. In a card punching machine, the combination of a gang of punches arranged in a plurality of rows, a gang of set bars or plungers similarly arranged for controlling the punches to be rendered effective for gang punching, a single row of key controlled members for consecutively operating said rows of plungers, a locking bar cooperative with a plurality of said plungers in each said row, a second independently operable locking bar cooperative only with a plurality of different plungers in the same row, the construction and arrangement of the parts being such that an actuation of a plunger coacting with one of said locking bars is effective to release the previously locked plungers controlled thereby without effecting a release of the plungers locked by the other of said locking bars, and a single releasing means for all of said locking bars.

25. In a card punching machine, the combination of a gang of punches arranged in a plurality of rows, a gang of set bars or plungers similarly arranged and movable into or out of effective position for individually controlling the punches to be rendered effective for gang punching, a single row of key controlled members for consecutively operating said rows of plungers, a pair of independently operable locking bars interposed between each pair of adjacent rows of plungers, locking pins projecting to one side from part only of the plungers in each row and cooperating with one only of the adjacent locking bars, the remainder of the plungers in each row having pins that project therefrom to the opposite side from the first mentioned pins and coact only with another adjacent locking bar, whereby a set-up of the plungers may be effected in one part of each row without releasing the previously set-up plungers in another portion of the same row, and a single releasing means for all of said locking bars.

26. In a card punching machine, the combination of a die, a gang of punches, columns of set bars cooperating therewith, separate means cooperating with the respective half columns of set bars for locking them, means for actuating the half columns of set bars, an indicator cooperating therewith for showing whether said means is associated with upper or lower half columns, and another actuating means for operating set bars in an entire column.

WILLIAM W. LASKER.